US 6,641,212 B2

(12) United States Patent
Sitzler

(10) Patent No.: US 6,641,212 B2
(45) Date of Patent: Nov. 4, 2003

(54) MOTOR-VEHICLE THROUGH-SEAT HOLDER FOR ELECTRICAL EQUIPMENT

(75) Inventor: Wolfgang Sitzler, Wuppertal (DE)

(73) Assignee: Peter Butz GmbH & Co. Verwaltungs-KG, Langenfeld (DE)

( * ) Notice: Subject to any disclaimer, the term of this patent is extended or adjusted under 35 U.S.C. 154(b) by 0 days.

(21) Appl. No.: 10/101,478

(22) Filed: Mar. 19, 2002

(65) Prior Publication Data

US 2002/0135211 A1 Sep. 26, 2002

(30) Foreign Application Priority Data

Mar. 20, 2001 (DE) .......................... 101 13 619

(51) Int. Cl.[7] .............................................. A47C 31/00
(52) U.S. Cl. .............................. 297/217.3; 297/188.06; 297/113; 297/115; 439/34; 224/275; 224/539
(58) Field of Search ...................... 297/217.3, 188.04, 297/188.06; 224/539, 275, 544, 557; 439/34

(56) References Cited

U.S. PATENT DOCUMENTS

| 3,019,050 | A | * | 1/1962 | Spielman | 297/217.3 |
| 3,093,412 | A | * | 6/1963 | Gore et al. | 297/217.1 |
| 6,092,705 | A | * | 7/2000 | Meritt | 224/275 |
| 6,199,948 | B1 | * | 3/2001 | Bush et al. | 297/217.3 |
| 6,354,843 | B1 | * | 3/2002 | Kato | 439/34 |
| 6,367,857 | B2 | * | 4/2002 | Kifer et al. | 296/24.1 |
| 6,445,408 | B1 | * | 9/2002 | Watkins | 348/148 |
| 6,484,915 | B2 | * | 11/2002 | Butz et al. | 224/539 |
| 2002/0060481 | A1 | * | 5/2002 | Jones | 297/188.04 |

FOREIGN PATENT DOCUMENTS

| DE | 19727499 | 7/1998 | |
| DE | 197 27 499 | 7/1998 | |
| DE | 100 04 021 | 6/2001 | |
| DE | 10004021 | 8/2001 | |
| JP | 05042853 A | * 2/1993 | .......... B60R/11/02 |

* cited by examiner

Primary Examiner—Peter R. Brown
Assistant Examiner—Stephen D'Adamo
(74) Attorney, Agent, or Firm—Herbert Dubno; Andrew Wilford

(57) ABSTRACT

A motor-vehicle seat back formed with a throughgoing aperture has an annular frame fixed in the aperture and at least one electrical contact exposed on the aperture frame. An insert has a frame complementarily fittable with the aperture frame, an electrically powered module, and at least one electrical contact on the insert frame electrically connected to the module and engageable when the insert is fitted to the aperture frame with the contact of the aperture frame. Respective latch formations on the frames are relatively displaceable between a holding position securing the insert in the aperture frame with the contacts in electrical connection with each other and a releasing position permitting the insert to be separated from the aperture frame. A latch mechanism on the aperture frame displaces the latch formation of the aperture frame into the releasing position for freeing the insert from the aperture frame.

7 Claims, 4 Drawing Sheets

US 6,641,212 B2

MOTOR-VEHICLE THROUGH-SEAT HOLDER FOR ELECTRICAL EQUIPMENT

FIELD OF THE INVENTION

The present invention relates to a motor-vehicle through-seat holder.

BACKGROUND OF THE INVENTION

It is standard as described in German patent documents 100 04 021 of P. Butz and 197 27 499 of W. Sitzler to form a motor-vehicle seat back, typically the back seat, with a through-going aperture that is in turn fitted with a frame. Normally a cushion or the like is set in the frame for normal use of the seat back. For transporting elongated objects the insert can be taken out and the objects can project from the rear luggage compartment or wayback through the aperture into the back seat area, allowing skis or fishing rods to be accommodated. It is even standard to provide an alternate insert that is constituted as a bag that can expand forward so that the objects inserted from the rear do not soil the seat or rattle about. Alternately the insert can be a television or refrigerator that is plugged into the vehicle's cigarette-lighter power outlet.

OBJECTS OF THE INVENTION

It is therefore an object of the present invention to provide an improved through-seat holder.

Another object is the provision of such an improved through-seat holder which can serve other functions.

SUMMARY OF THE INVENTION

A motor-vehicle seat back formed with a throughgoing aperture, has according to the invention an annular frame fixed in the aperture and at least one electrical contact exposed on the aperture frame. An insert has a frame complementarily fittable with the aperture frame, an electrically powered module, and at least one electrical contact on the insert frame electrically connected to the module and engageable when the insert is fitted to the aperture frame with the contact of the aperture frame. Respective latch formations on the frames are relatively displaceable between a holding position securing the insert in the aperture frame with the contacts in electrical connection with each other and a releasing position permitting the insert to be separated from the aperture frame. A latch mechanism on the aperture frame displaces the latch formation of the aperture frame into the releasing position for freeing the insert from the aperture frame.

Thus with this system the module, e.g. a television or refrigerator, on the insert frame can be supplied with electricity through the aperture frame, with the connection made automatically when the insert is snapped into place. There is no need to make a separate connection; simply fitting the unit into the seat back makes the necessary electrical connection. The aperture frame will still work with a through-seat ski bag or the like.

The insert according to the invention is fitted to and removable from the aperture frame in a direction transverse to a plane of the aperture frame. The contact of the aperture frame is exposed in the direction. More particularly the contact of the aperture frame is also exposed opposite to the direction and the insert can be fitted from opposite sides to the aperture frame. To this end the insert frame has an outwardly projecting ridge having a pair of opposite faces and the contact of the insert frame is exposed on both faces of the ridge. Similarly the aperture frame has a pair of oppositely directed faces and the contact of the aperture frame is exposed on both of the faces.

The aperture-frame contact according to the invention is adapted to be connected to a motor-vehicle power source. Furthermore the aperture frame has a pair of sides each formed with a guide groove. The formations including respective bars slidable in the grooves and each having a pair of pins projecting through the aperture frame and undercut notches formed on the insert frame and engageable around the pins.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
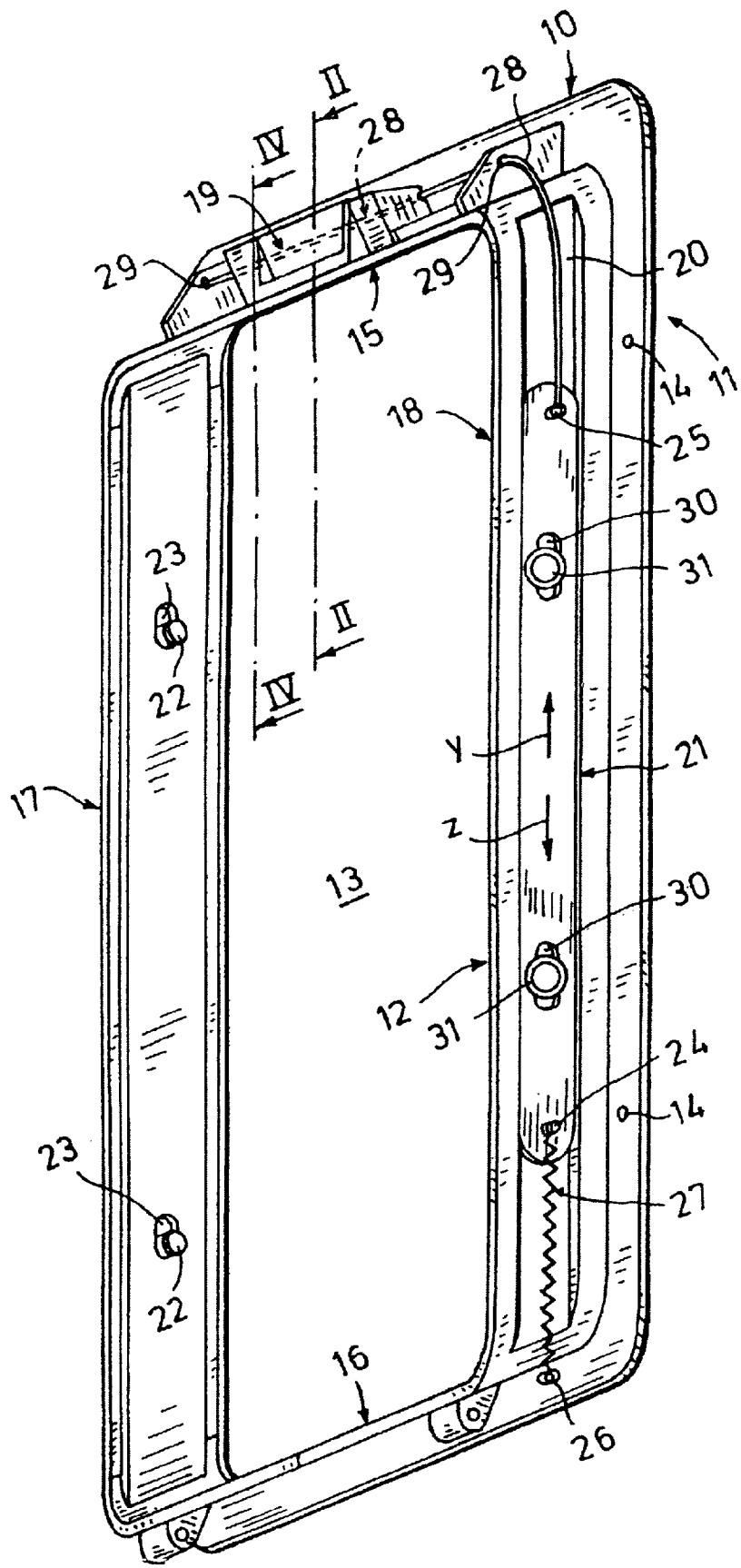
FIG. 1 is a perspective view of a through-seat frame according to the invention.

As seen in FIG. 1 a frame 10 adapted to be set in an aperture in a motor-vehicle seat back shown schematically at 39 (FIGS. 2–4) has an annular and planar flange 11 adapted to sit flatly against one face of the seat back 39, secured in place by screws through holes 14. Projecting transversely from this planar flange 11 is another flange 12 defining an opening 13 and formed by a top rail 15, a bottom rail 16 parallel thereto, and two side rails 17 and 18 parallel to each other and perpendicular to the top and bottom rails 15 and 16.

Figure 2:
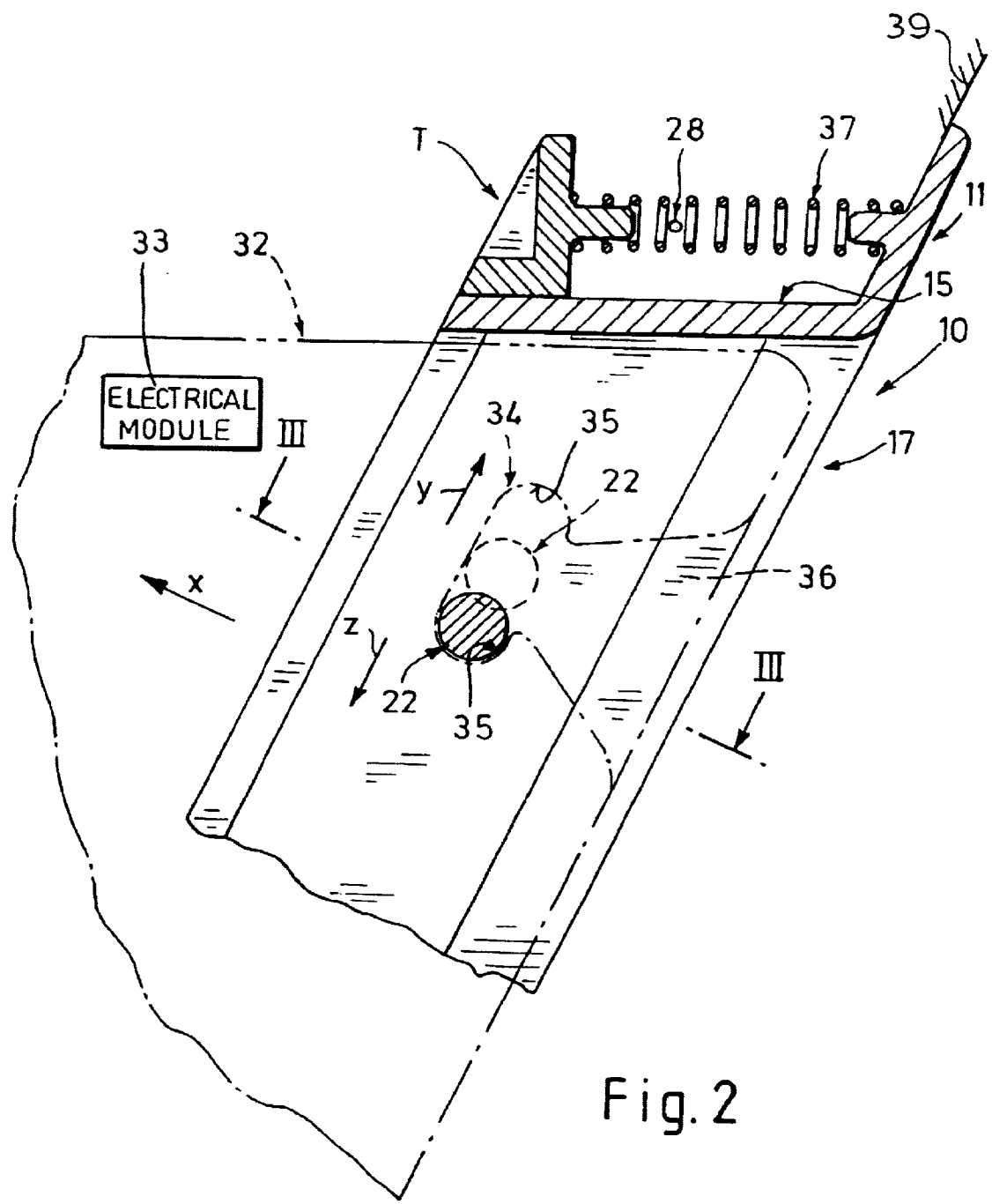
FIG. 2 is a section taken along line II—II of FIG. 1.
Figure 3:
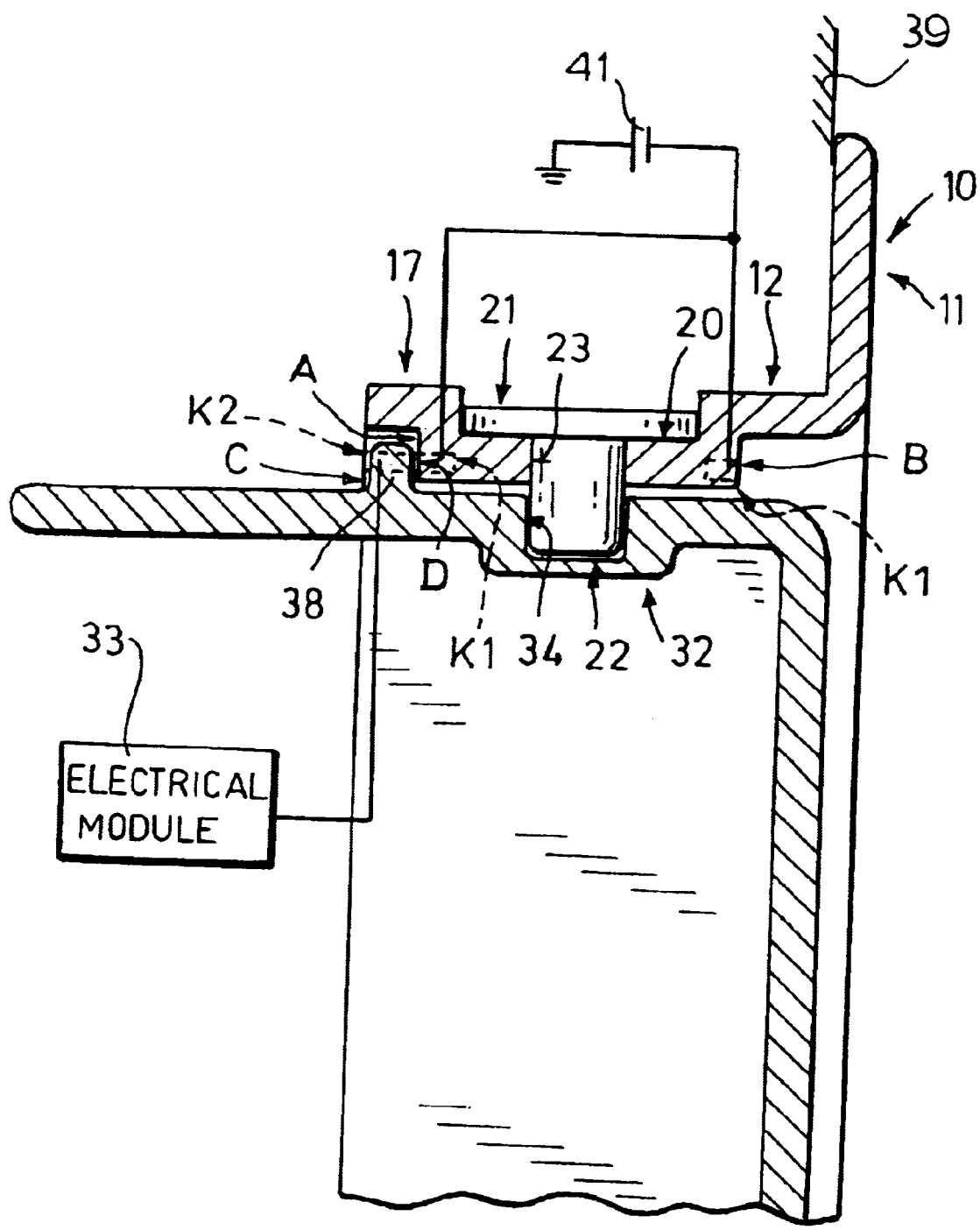
FIG. 3 is a section taken along line III—III of FIG. 2.
Figure 4:
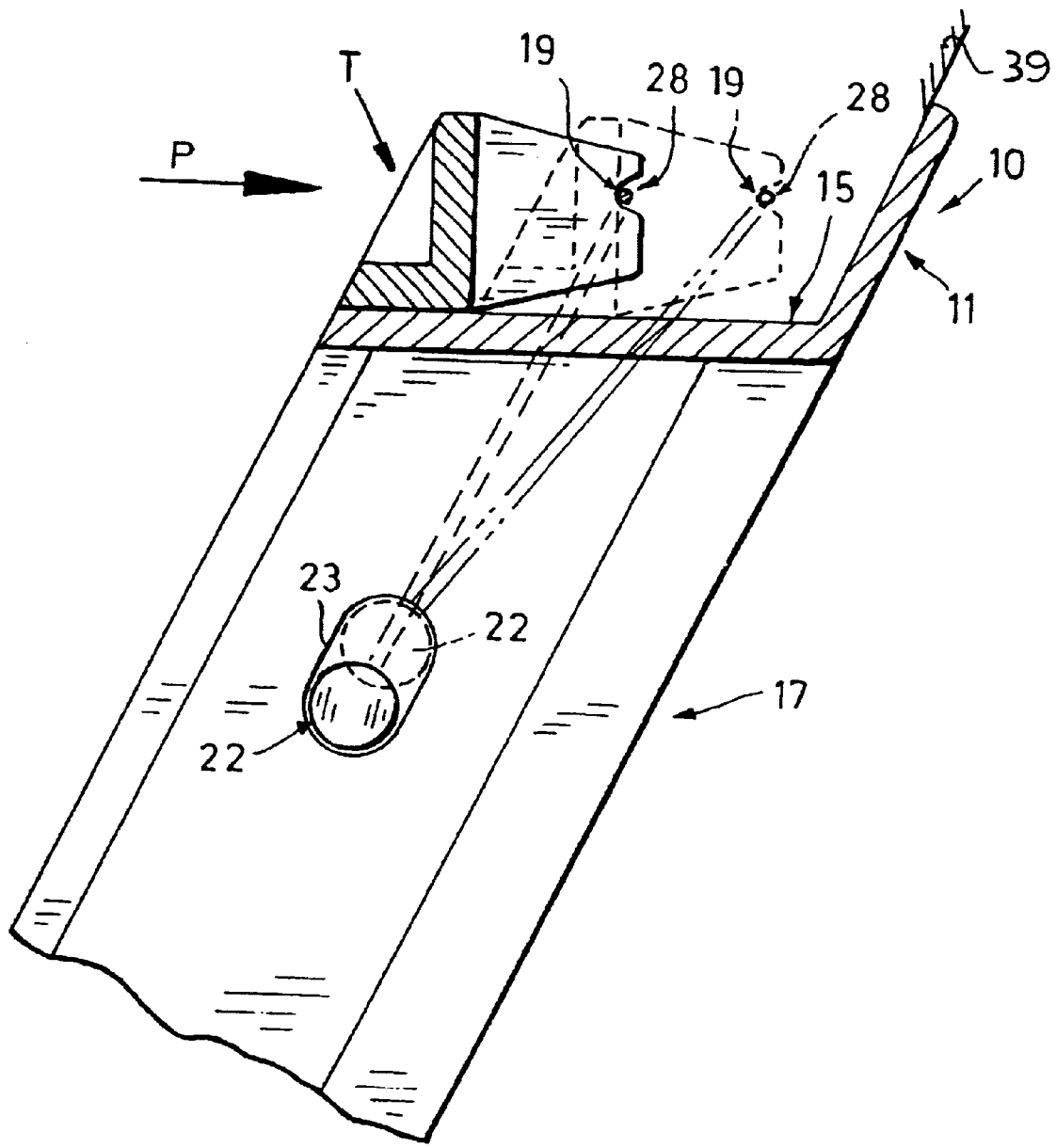
FIG. 4 is a section taken along line IV—IV of FIG. 1.

As shown in FIG. 3, a groove 20 in the outside face of each side rail 17 and 18 (only one shown) accommodates a respective latch bar 21 having a pair of latch bolts 22 projecting through slots 23 in the sides 17 and 18. Bolts 31 fixed in the side rails 17 and 18 pass through slots 30 in the bars 21 50 that they can slide limitedly as shown by direction arrows y and z in FIG. 1. The top ends of the latch bars 21 are anchored at 25 to ends of a flexible element 28 passing through eyes in webs 29 extending parallel to the sides 17 and 18 between the upper rail 15 and the front flange 11. A release handle T best seen in FIG. 2 is pressed outward by a spring 37 and can move inward by a pressure P to bear with a notch 19 against the flexible element 28 to pull the two latch bars 21 upward in their slots 20 the direction y as shown in FIG. 4. Respective springs 27 anchored at 26 in the frame 10 and at 24 on the lower ends of the latch bars 21 urge them downward in the direction z.

FIG. 2 further shows how the frame 10 accommodates a complementarily shaped insert 32 having an electronic module 33, for instance a television or piece of communication equipment. This insert 32 has sides each formed with a pair of formations or notches 36 that are undercut at 35 to accommodate the pins 22. The notches 36 each have a rear edge 34 against which the respective pin 22 can slide when moved by the handle T. Thus the insert 32 can be snapped in place with the pins 22 solidly locking it in position. The insert 32 moves in a direction x on removal from the frame 10 and the notches 36 are open oppositely to this direction x.

As further shown in FIG. 3, the insert 32 is formed with an outwardly projecting square-section ridge 38 that can bear against inner or outer annular faces A or B of an inwardly projecting ridge 40 on the sides 17 and 18 (only 17 shown). When in such engagement, contacts K2 that extend all the way through the ridge 38 and are exposed on both of its faces C and D can engage contacts K1 provided on both of the faces A or B of the ridge 40 of the frame 10. Thus when the insert 32 is fitted in place, the module 33 connected to the contacts K2 can be supplied with power from the frame 10. This makes it possible, for example, for the module 33 to be supplied power from the vehicle's battery 41. The contacts K1 and K2 could also carry control signals.

I claim:

1. In a motor-vehicle seat back formed with a through-going aperture, an assembly comprising:

an annular aperture frame fixed in the aperture;

an aperture electrical contact exposed on the aperture frame;

an insert frame complementarily fittable with the aperture frame;

an electrically, powered module on the insert frame;

an insert electrical contact on the insert frame electrically connected to the module and engageable when the insert frame is fitted to the aperture frame with the contact of the aperture frame;

respective latch formations on the insert and aperture frames relatively displaceable between a holding position securing the insert frame in the aperture frame with the aperture and insert contacts in electrical connection with each other and a releasing position permitting the insert frame to be separated from the aperture frame; and means on the aperture frame for displacing the formations into the releasing position for freeing the insert frame and the module thereon from the aperture frame.

2. The seat-back frame assembly defined in claim 1 wherein the insert frame is fitted to and removable from the aperture frame in a direction transverse to a plane of the aperture frame, the aperture contact being exposed in the direction.

3. The seat-back frame assembly defined in claim 2 wherein the aperture contact is exposed opposite to the direction and the insert frame can be fitted from opposite sides to the aperture frame.

4. The seat-back frame assembly defined in claim 1 wherein the insert frame has an outwardly projecting ridge having a pair of opposite faces and the insert contact of the insert frame is exposed on both faces of the ridge.

5. The seat-back frame assembly defined in claim 3 wherein the aperture frame has a pair of oppositely directed faces and the aperture frame includes a pair of aperture contacts which are exposed on both of the faces.

6. The seat-back frame assembly defined in claim 1 wherein the aperture contact is adapted to be connected to a motor-vehicle power source.

7. The seat-back frame assembly defined in claim 1 wherein the aperture frame has a pair of sides each formed with a guide groove, the formations including respective bars slidable in the grooves and each having a pair of pins projecting through the aperture frame and undercut notches formed on the insert frame and engageable around the pins.

* * * * *